Dec. 16, 1969     S. TARADASH ET AL     3,483,706
SHAFT AND TUNNEL LINING

Filed June 19, 1967     2 Sheets-Sheet 1

INVENTOR
Samuel Taradash &
Nicholas Chlumecky

INVENTORS
Samuel Taradash &
Nicholas Chlumecky.

United States Patent Office 3,483,706
Patented Dec. 16, 1969

3,483,706
SHAFT AND TUNNEL LINING
Samuel Taradash, Liberty Township, Trumbull County, and Nicholas Chlumecky, Poland, Ohio, assignors to Commercial Shearing & Stamping Company, a corporation of Ohio
Filed June 19, 1967, Ser. No. 647,128
Int. Cl. E21d 11/22; E04f 15/14; E04c 1/30
U.S. Cl. 61—45                              6 Claims

ABSTRACT OF THE DISCLOSURE

A shaft and tunnel lining and a liner plate therefor of separate rectilinear arcuate members having radially outwardly or inwardly extending flanges on all edges bolted together, said flanges being spaced on the arcuate members to form a substantially closed well containing a chemical sealing agent under compression.

---

This invention relates to shaft and tunnel lining and particularly to watertight steel shaft and tunnel lining. The problems of providing a watertight shaft or tunnel lining have been recognized for many years by engineers and builders of tunnels. For years people have been experimenting with various methods and materials to make a shaft or tunnel lining watertight. One of the great problems in all shaft and tunnel lining operations is that of sealing out water, particularly at the joints between the members forming the lining.

In the field of tunnel lining, it has been the practice to drive the tunnel under compressed air to keep the water from entering the tunnel. This practice involves very substantial costs in addition to the mere cost of excavating and lining. For example, such a practice involves in addition (1) a plant with electrical substations to supply large quantities of compressed air pressure to the tunnel, (2) standby diesel power units for the air supply, (3) a source of additional volume of air as the tunnel lengthens, (4) extra labor costs resulting from shorter shifts because of health hazards from the high air pressure and higher wage rates commanded by labor for the extra hazards involved, and (5) extra labor costs resulting from the longer time needed to erect reinforcing and pour permanent concrete linings at short intervals as is required when working under high air pressure as well as the disruption of normal mining and mucking cycles by these frequent concreting intervals, all of which labor rates are higher because of the health hazard under high pressure.

In the case of shaft sinking, the entry of water into the shaft requires pumping equipment and generally poor working conditions when large amounts of water enter the shaft.

In the past, attempts have been made to caulk a tunnel or shaft lining with lead caulking, asbestos rope or tar. These materials have been applied while the tunnel was being erected or where driven or injected into place after the lining was erected. Uniformly, these caulkings have met with little or no success for sealing linings permanently due to thermal expansion and contraction of the lining after it has been installed and also due to slight movement of the ground around the tunnel and vibrations which occur with heavy vehicular traffic. Mining has continued to be practiced under high pressure in the tunnels.

We have solved these problems of prior art shaft and tunnel lining by very simple expedients and have made it possible to mine tunnels or shafts using much smaller air volumes and to provide better control of concreting so that the entire concrete operation and clean-up is done in free air.

Preferably we provide a shaft or tunnel liner made up of a plurality of rectilinear arcuate members having radially outwardly extending flanges on all edges adapted to be bolted together at said flanges, said flanges being spaced with respect to the edges so as to form a rectilinear substantially closed well between the flanges of adjacent members and a chemical sealant in said well capable of swelling on contact with water into sealing engagement with at least a part of the well, said plurality of members being drawn together under pressure substantially to close the periphery of said well, thereby sealing the adjacent edges together. Preferably the chemical sealant is a material which is under a compression load or which may be capable of swelling on contact with water to provide compressive loading and is retained within a fixed area of the well, the balance of the well being filled with a flowable material resistant to water wetting. Spaced reinforcing members are preferably fixed to the members on the external periphery to take edge to edge thrust.

In the foregoing general description we have set out certain objects, purposes and advantages of our invention. Other objects, purposes and advantages will be apparent from a consideration of the following specification and the accompanying drawings in which.

Figure 1:
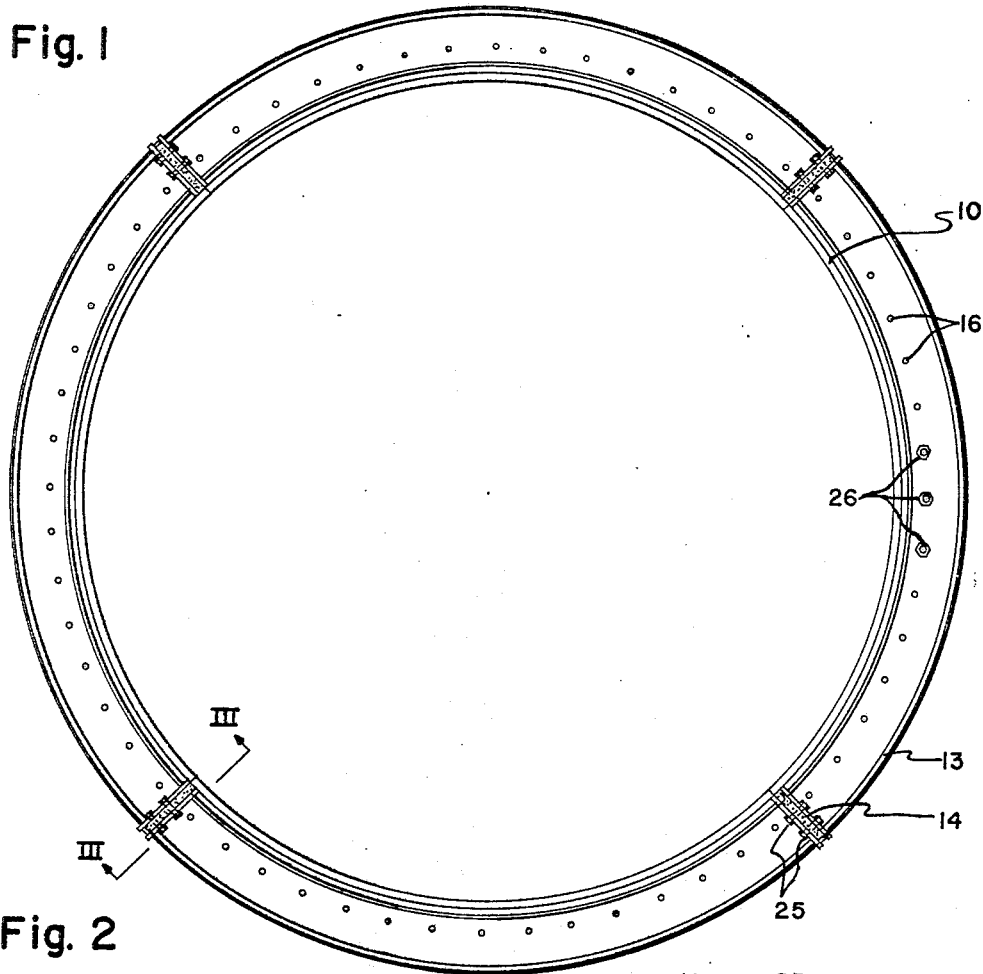
FIGURE 1 is a top plan view of a liner plate assembly according to our invention.
Figure 2:
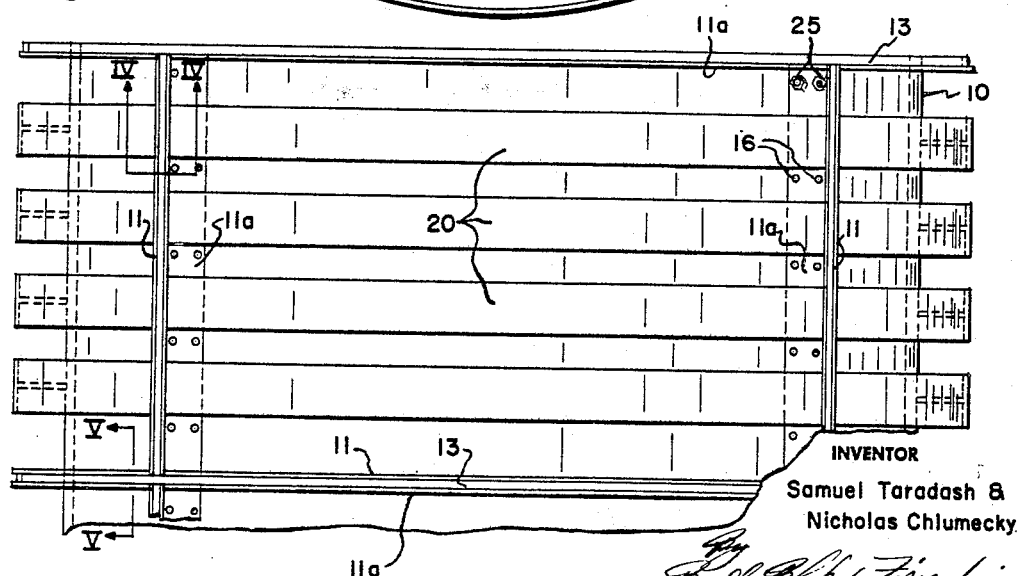
FIGURE 2 is a side elevation of the liner plate assembly of FIGURE 1.

Referring to the drawings we have illustrated an elongated rectilinear plate 10 bent to arcuate form and having arcuate side flanges 11 and 11a and end flanges 12 and 12a which extend radially outwardly on the plates 10. Each of the flanges 11a and 12a are spaced from the edge of plate 10 and are provided with a rib 13 at the end remote from plate 10 defining with the extending edge 10a and the flange, a groove or well 14. The flanges of adjacent plates are bolted together by bolts passing through openings 16. The well 14 may be provided with an intermediate rib 18 dividing the well into two parts 14a and 14b. The portion 14a is filled with a chemical sealant which expands on contact with water such as Dowell "CSR." The portion 14b is filled where necessary with a polymer coated sand such as Dowell "CSR."

Strengthening members 20, in the form of T-bars or other shapes, may be welded at spaced intervals between side flanges 11 and 11a to take the thrust of the jacks used in moving the tunnel excavating head.

Preferably, where high water pressures occur on the shaft or tunnel lining we also insert at the joint line 19 between adjoining plates a stainless steel shim 21 which may be flat or bent as shown. This acts to prevent extrusion of sealant under the pressure of water or expanding sealant and eliminates the need for machined joining surfaces.

Figure 4:
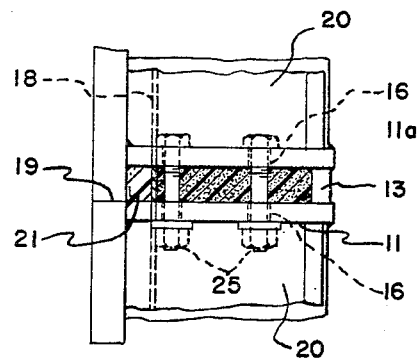
FIGURE 4 is an enlarged segmental section through the assembled tunnel lining of FIGURE 2 on the line IV—IV.
Figure 5:
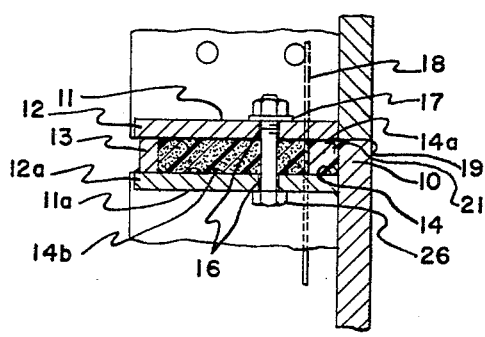
FIGURE 5 is an enlarged segmental section of a second embodiment of joint on the line V—V of FIGURE 2.
Figure 3:
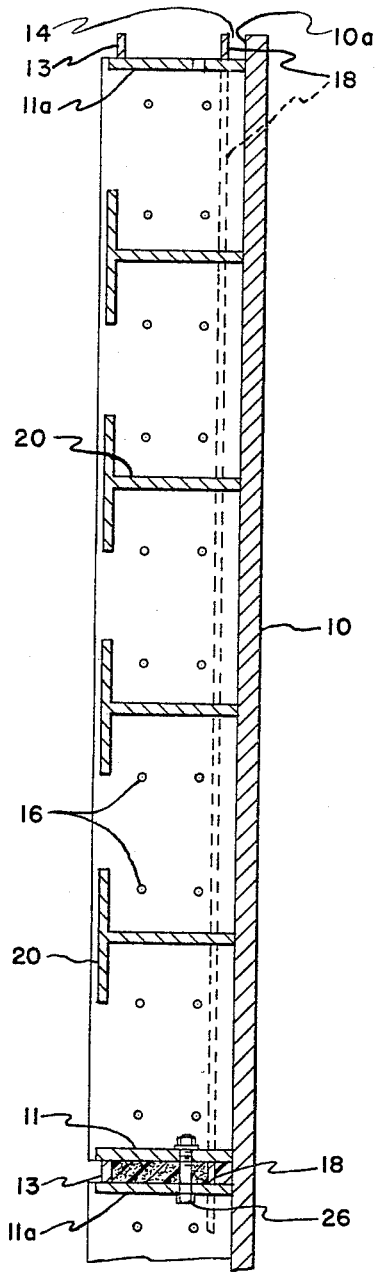
FIGURE 3 is a section on the line III—III of FIGURE 1.

The segmental steel lining is preferably joined along the side edges by paired bolts 25 as shown in FIGURE 4 and along the end edges by a single line of bolts 26, although this arrangement is not critical. The T-bar stiffeners are preferably used on the inside or outside of the skin plates as shown to act not only as stiffeners for the plates but as anchors for the concrete poured behind or inside the liners.

While we have illustrated and described certain preferred practices and embodiments of our invention, it will be understood that this invention may be otherwise embodied within the scope of the following claims.

We claim:

1. A tunnel liner comprising a plurality of rectilinear arcuate side-by-side members forming a cylinder, said arcuate members having radially extending flanges on all edges, an arcuate rib on at least two adjacent edge flanges engaging flanges on the next adjacent members, said flanges and ribs being spaced with respect to said edges so as to form a substantially closed well between the flanges of adjacent members with said ribs and members, and a sealant under compression in said well, said arcuate members being drawn together at the flanges substantially to close the periphery of said well and confine the sealant on all sides, and means acting on said flanges to draw them together.

2. A tunnel liner as claimed in claim 1 wherein a shim is provided in said well overlying over the adjacent edges of adjacent members.

3. A tunnel liner as claimed in claim 1 wherein said arcuate members are drawn together at the flanges by bolts passing through holes in said flanges to place the sealant under compression.

4. A tunnel liner as claimed in claim 3 wherein the sealing means includes a portion of chemical sealant capable of swelling on contact with water adjacent the joint between the members.

5. A tunnel liner plate comprising an arcuate plate member having radially extending flanges on all edges, an arcuate rib on at least two adjacent flanges, said flanges and ribs being spaced with respect to said edges with said ribs extending on the same side of the flanges as the plate edges so as to form a well around said at least two adjacent edges of said plate, and spaced bolt holes in said flanges receiving tightening bolts.

6. A tunnel liner as claimed in claim 1 wherein the sealant is a water-swelling agent.

References Cited

UNITED STATES PATENTS

| 907,357 | 12/1908 | Hoff | 61—43 |
| 1,923,006 | 8/1933 | Proctor | 61—45 |
| 2,015,102 | 9/1935 | Doig | 61—45 |
| 2,277,286 | 3/1942 | Bechtner | 61—30 |
| 2,484,904 | 10/1949 | Pennella. | |
| 3,396,543 | 8/1968 | White | 61—45 |

JACOB SHAPIRO, Primary Examiner

U.S. Cl. X.R.

52—393, 394, 586; 106—287; 114—86